Patented Dec. 15, 1942

2,304,946

UNITED STATES PATENT OFFICE 2,304,946

TRIARYLMETHANE COMPOUND

James G. McNally, Joseph B. Dickey, and James A. Van Allan, Rochester, N. Y., assignors to Eastman Kodak Company, Rochester, N. Y., a corporation of New Jersey No Drawing. Application April 19, 1940, Serial No. 330,630

1 Claim. (Cl. 260—393)

The present invention relates to new dyestuffs of the triarylmethane series. More particularly, it relates to triarylmethane dyes containing at least once in their molecule the group having the formula:

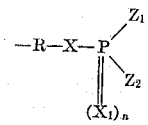

wherein R represents an alkylene group, X and $X_1$ each represents a member selected from the group consisting of an atom of oxygen, and an atom of sulphur, $n$ represents zero or the numeral 1, and $Z_1$ and $Z_2$ each represents a member selected from the group consisting of an amino group, an alkylamino group, a hydroxyalkylamino group of at least two carbon atoms, and a hydroxyl group and its alkali forming metal salts, and wherein the said group is joined to a nuclear carbon atom of an aryl nucleus of the molecule through a member selected from the group consisting of an oxygen atom, a sulphur atom, a nitrogen atom of an amino group, a nitrogen atom of a quaternary ammonium group, and a carbon atom of the alkylene group R.

More specifically, R represents a member selected from the group consisting of a methylene group, an ethylene group, a propylene group, a butylene group, and the like, while $Z_1$ and $Z_2$ each represents a member selected from the group including a methyl group, an ethyl group, a propyl group, a butyl group, a cetyl group, a methoxy group, an ethoxy group, a butoxy group, an alkoxyalkyl group such as a methoxyethyl group, an ethoxymethyl group, an amino group, a methylamino group, an ethylamino group, a propylamino group, a cetylamino group, a β-hydroxyethylamino group, a β-hydroxypropylamino group, a γ-hydroxypropylamino group, a β,γ-dihydroxypropylamino group, an ω-hydroxybutylamino group, a hydroxyl group and its sodium, potassium, calcium, barium, methylamine, ethylamine, and the like salts. Further the aryl groups forming the triphenylmethane nucleus are represented by members selected from the group consisting of benzene nuclei, naphthalene nuclei, and furyl nuclei. These nuclei may be substituted by one or more monovalent substituents selected from the group including an alkyl group such as methyl, ethyl, cetyl, and the like; a halogen atom such as chlorine, bromine and fluorine; an alkoxy group such as methoxy, ethoxy and butoxy; an amino group; an alkyl substituted amino group such as methylamino, dimethylamino, propylamino, and the like; an acyloxy group such as acetyl, propionyl and butyryl; a nitro group; and other similar kind of radicals.

We have found that the above described triarylmethane compounds are not only valuable as coloring agents for textile materials such as organic derivatives of cellulose, silk, wool, viscose or cotton, and for lacquers, plastics and sheet materials, but also certain members which contain no substituent in the aryl groups ortho to the arylmethane carbon atom are valuable dyes for anti-halation backings for photographic films. Materials treated by these dyes acquire colors ranging from blue to green shades. In their use as backing dyes on photographic films, their ready and complete solubility in the developing solutions is a desirable feature. It is an object of the invention, therefore, to prepare the compounds described and to color the materials designated, as well as to back photographic films therewith.

The necessary triarylmethanes and anhydrotriarylcarbinols may be prepared in known manner by a number of methods. For example, 1 mole of benzaldehyde condensed with 2 moles of butyl-β-hydroxyethylamino benzene yields 4,4'-bis-butyl-β-hydroxyethylamino-triphenylmethane which may be oxidized with lead peroxide in the presence of an acid to the dye compound anhydro-[4,4'-bis-butyl-β-hydroxyethylamino-]-triphenylcarbinol. If the benzaldehyde nucleus is substituted by one or more monovalent substituents such as those previously named, there is obtained the corresponding substituted dye derivatives. The nucleus of the butyl-β-hydroxyethylamino benzene may likewise be substituted. Further, in place of butyl-β-hydroxyethylaminobenzene, there may be substituted various other benzene or naphthalene compounds which contain a hydroxyl or sulfhydryl group in a side chain or a sulfhydryl group attached to a nuclear carbon atom. Another method for the preparation of the necessary intermediates consists of condensing 1 mole of formaldehyde with 3 moles of the desired benzene or naphthyl compound, and then oxidizing the leuco compound thus obtained to the dyestuff.

The invention is further illustrated by the following examples.

Example 1

A mixture of equal molecular proportions of anhydro-(2-methoxy-4'-ethyl-β-hydroxyethylamino-4''-β-hydroxyethylamino ethyl chloride)-triphenylcarbinol and the methyl ester of di-chlorohypophosphorous acid is reacted in pyridine or carbon tetrachloride in the presence of dimethylaniline, sodium carbonate or other similar kind of basic substance. Ammonia water is then added and the reaction mixture warmed to hydrolyze the halogen atoms from the dye molecule. The mixture is evaporated to dryness, the residue dissolved in hydrochloric acid, the dye salted out, filtered off and dried. The dye compound thus obtained has the formula:

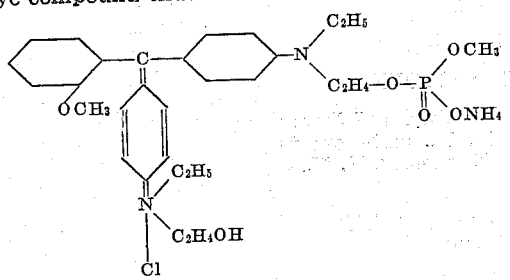

and colors cellulose acetate blue-green shades from an aqueous solution of the dye which may contain salt.

If 2 moles of the methyl ester of dichlorohypophosphorous acid are employed, there is obtained the corresponding di-substituted derivative. In place of the triphenylmethane used as the starting material in the above, there may be substituted the compound having the formula $C_6H_5.N(-C_3H_6OH).C_6H_4.C(furyl):$
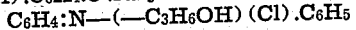
$C_6H_4:N-(-C_3H_6OH)(Cl).C_6H_5$

Example 2

A mixture of equal molecular proportions of anhydro-(3-β-hydroxyethyloxy - 4' - ethylamino-4''-amino ethyl chloride)-triphenyl-carbinol and phosphoric acid is heated on a water bath until the reaction is complete. The mixture is then poured into water, the solution evaporated to dryness, the residue redissolved in water, and the dye salted out, filtered off and dried. The compound thus obtained has the formula:

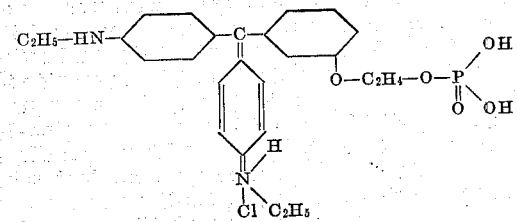

and colors cellulose acetate blue-green shades from an aqueous solution which may contain salt.

Example 3

1 mole of 4,4'-bis[(di-β-hydroxyethyl-)amino-]-triphenyl-methane and phosphorus trichloride approximately 10% in excess of 4 moles are warmed together on a steam bath until the evolution of hydrogen chloride ceases. Aqueous sodium carbonate containing ice is added to hydrolyze the halogen atoms remaining on the phosphorus, and the solution evaporated to dryness. The residue is then redissolved in aqueous acetic acid, oxidized with the calculated amount of lead dioxide, and the dye thus obtained is salted out, filtered off and dried. The dye has the formula:

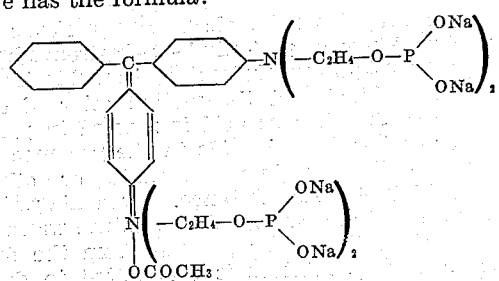

and colors silk and wool green shades from an aqueous solution of the dye which may contain salt. In addition, the dye may be used for tinting transparent sheets comprising a cellulose organic derivative, as well as an anti-halation backing dye for photographic films. The reaction may be conducted in a solvent medium such as pyridine, quinoline, dimethylaniline, dioxane, chloroform or carbon tetrachloride. While the example discloses only the sodium salt, the corresponding salts of potassium, calcium, barium, ammonium, ethylamine, and the like, may be prepared in a similar manner.

In place of 4,4'-bis[(di-β-hydroxyethyl-)-amino-]-triphenylmethane, there may be substituted 4,4'-bis(β-sulfoethyl - β' - hydroxyethylamino-)-triphenylmethane, 4,4'-bis[(di - β,γ - dihydroxypropyl-)amino - ] - triphenylmethane, 4,4' - bis-(ethyl - γ - mercaptopropylamino - ) - triphenyl - methane, 4',4''-bis(ethyl - β - hydroxyethylamino-)-4-methoxy-triphenylmethane, 4',4'' - bis-(ethyl - β,γ - dihydroxypropylamino-)-2 - chlorotriphenylmethane, and 4',4''-bis[(di-β-hydroxyethyl-)amino-]-2,4-dichloro - triphenylmethane. In some cases, where it may be desirable to esterify no more than two hydroxy groups, the phosphorus trichloride is limited to about 2 molar equivalents.

Example 4

1 mole of anhydro-[4,4'-bis(4-γ-hydroxypropyl-β' - mercaptoethylamino-)]-triphenylcarbinol is dissolved in pyridine and treated at room temperature with phosphorus trichloride in an amount 10% in excess of 4 moles. The reaction is completed by warming on a steam bath, after which the mixture is cooled, ice added, and the calculated amount of aqueous sodium carbonate stirred into the mixture. When the hydrolysis reaction is complete, the pyridine and water are removed by evaporation under reduced pressure. The residue is then redissolved in water and sufficient hydrochloric acid to form the quaternary salt added. The dye compound thus obtained has the formula:

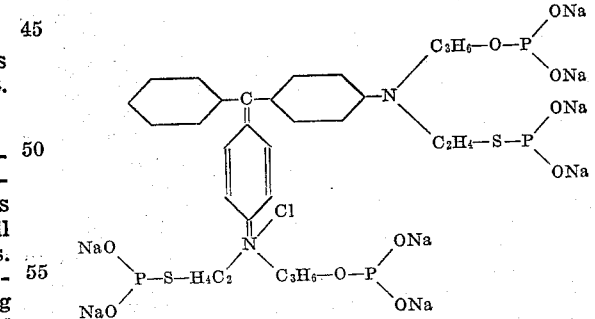

The above described process may also be employed for the preparation of other dyestuffs such as for example the hydrogen chloride salt of anhydro - (4',4'' - bis - β - disodium phosphitoethylamino-)-2-methyl-triphenylcarbinol, and the hydrogen chloride salt of α-naphthyl-anhydro-(4,4'-bis-ethyl - β - disodium phosphitoethylamino-)-diphenylcarbinol.

Example 5

1 mole of 4,4'-bis[(di-β-hydroxyethyl-) amino-]-triphenylmethane is phosphated with 4 moles of phosphorus trichloride as described in Example 4. To the reaction mixture there is then added slightly more than 8 moles of dimethylamine dissolved in pyridine. After the reaction is complete, lead peroxide is added in a calculated amount, and the solution evaporated to dryness under reduced pressure. The residue is redissolved in water, and sufficient hydrochloric acid added to form the quaternary salt, the dye product being obtained by salting out, filtering and drying. The compound thus obtained has the formula:

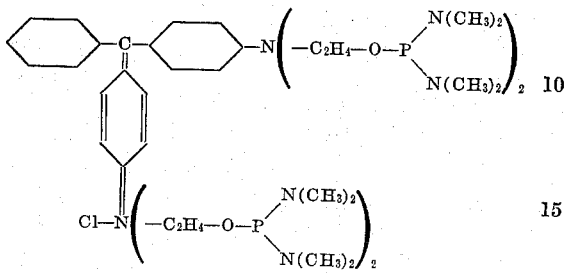

In a similar manner using only 4 molar equivalents of ammonia, there may be prepared from 4,4'-bis[(di-β-hydroxyethyl-)amino-] - diphenyl(α-naphthyl) methane the dye compound having the following formula:

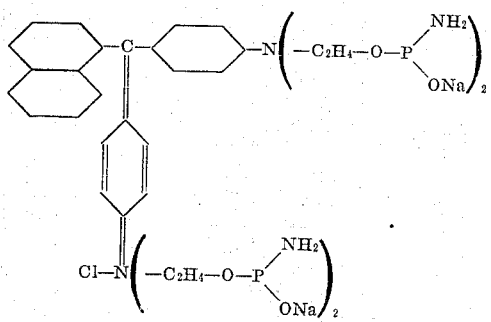

Example 6

1 mole of 4',4''-bis-dimethylamino-4-β-hydroxyethoxy-triphenylmethane is treated with 1 mole of phosphorus trichloride following the general procedure of Example 3. The dye thus obtained has the formula:

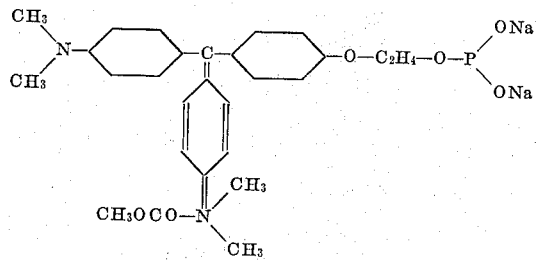

and colors cellulose acetate, silk and wool green shades from an aqueous solution of the dye which may contain salt. Similar dyestuffs are obtained if the triphenylmethane starting material above employed is replaced by 4',4''-bis-diethylamino-4-β-hydroxy-ethoxy-triphenylmethane, 4',4''-bis-dibutylamino-2,4-di-β-hydroxyethoxy- triphenylmethane, 2-nitro-4'-ethyl-β-hydroxyethylamino-2'-β-hydroxyethoxy-4''-ethyl - β - hydroxyethylamino-3''-β-hydroxyethoxy - triphenylmethane, 4',4''-bis-diethylamino-4-β-mercaptoethoxy-triphenylmethane, 4',4''-bis-dimethylamino- 2 - β - hydroxyethylthio-triphenylmethane, or 2-β-hydroxyethylthiophenyl-4' - diethylaminonaphthyl (1)-2''-β-hydroxyethoxy-4''-diethylaminonaphthyl (1)-methane. It will be understood that where the particular starting material has more than one hydroxyl or mercapto group, if desired, there may be employed more than one molecular equivalent of phosphorus trichloride.

Example 7

1 mole of anhydro-(4,4'-bis-diethylamino-2,2'-bis-hydroxyethyl-)-triphenylcarbinol is treated with 2 moles of PCl₃ following the procedure of Example 4. The compound has the formula:

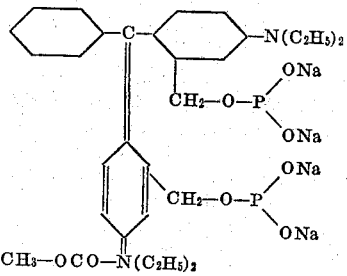

Instead of anhydro-(4,4'-bis-diethylamino-2,2'-bis-hydroxyethyl-)-triphenylcarbinol, there may be employed as starting materials other dye compounds of a similar nature which contain a hydroxyalkyl group as a nuclear substituent. Dyestuffs prepared from such starting materials include anhydro - (4',4'' - bis-diethylamino-2',2''-bis-disodium phosphitomethyl-4-disodium phosphitomethyl-)-triphenylcarbinol, anhydro-(4,4'-bis-ethyl-β-disodium phosphitoethylamino-2,2'-bis - disodium phosphitomethyl-)-triphenylcarbinol, or anhydro-[4',4''-bis-benzyl-β-hydroxyethylamino-3-β(β'-hydroxyethylamino-)- sodium phosphitomethyl-]-triphenylcarbinol. In place of phosphorus trichloride, there may be substituted the compound P(OC₂H₅)Cl₂, in which case the dyestuffs prepared therewith retain the ethoxy group.

Example 8

1 mole of 4,4'-bis[(di-β-hydroxyethyl-)amino-]-triphenylmethane is dissolved in pyridine and treated at room temperature for several hours with an amount of phosphorus oxychloride approximately 10% in excess of 4 moles. At the end of this time, the reaction mixture is warmed to and maintained at a temperature 70–75° C. for several hours, after which the greater portion of the pyridine is removed by evaporation under reduced pressure and the concentrate first cooled and then dissolved in cold aqueous sodium carbonate. The solution thus obtained is filtered and evaporated to dryness. The residue is redissolved in water, the solution made acid with excess of acetic acid, oxidized with lead dioxide, and the dye salted out, filtered off and dried. The compound has the formula:

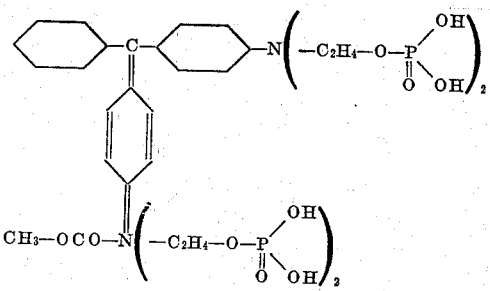

The above reaction may be conducted equally well in solvent mediums other than pyridine, as for example in alkylated pyridines, quinoline, dimethylaniline, dioxane containing sodium bicarbonate, and similar kind of basic solvents. In place of phosphorus oxychloride, there may be employed thiophosphoryl chloride, in which case the dyes obtained are the corresponding thiophosphato or dithiophosphato derivatives. The 4,4'-bis[(di-β-hydroxyethyl-) amino-]triphenylmethane may be substituted by α-naphthyl-4,4'-bis(ethyl - β - hydroxyethylamino-) - diphenylmethane, 2 - methoxyphenyl-4',4''-bis(ethyl-β,γ-dimercapto propylamino-) di-α-naphthyl-methane, 4 - methoxy-2',2''-bis-hydroxymethyl-4',4''-bis-diethylamino-diphenylmethane, 2-chloro-2'-β - hydroxyethoxy-4',4''-bis-β-hydroxyethylamino-triphenylmethane, 4 - hydroxymethyl - 4',4''-bis-β-hydroxypropylamino-triphenylmethane, or 2 - mercapto-4',4''-bis-β-hydroxyethylamino-triphenylmethane. If 2-methoxyphenyl-4',4''-bis-(ethyl - β,γ-dimercaptopropylamino-) di-α-naphthyl-methane is treated in the manner described with 4 moles of thiophosphoryl chloride, and the dye salted out from a hydrochloric acid solution the compound obtained has the formula:

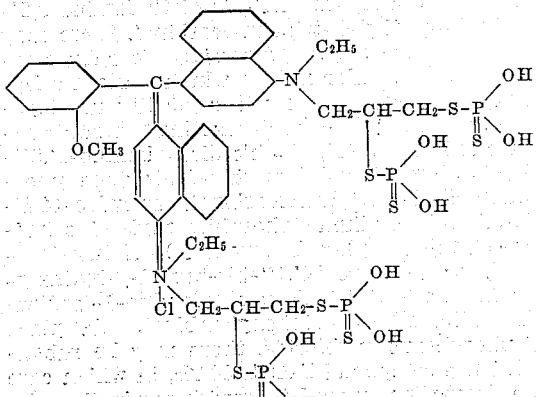

*Example 9*

1 mole of 4,4'-bis[(di-β,γ-dihydroxypropyl-)-amino-]-triphenylmethane is treated for several hours at room temperature with an amount of thiophosphoryl chloride approximately 10% in excess of 8 moles in a solvent medium of pyridine. At the end of this time, the reaction mixture is warmed at 70-75° C. for several more hours, the pyridine then eliminated by evaporation under reduced pressure, the residue dissolved in a cold solution of aqueous sodium carbonate, and the solution evaporated to dryness. The residue is redissolved in water, the solution acidified with an excess of hydrochloric acid, oxidized with a calculated amount of lead peroxide, and the dye recovered from the mixture by salting out, filtering off, and drying. The dye obtained has the formula:

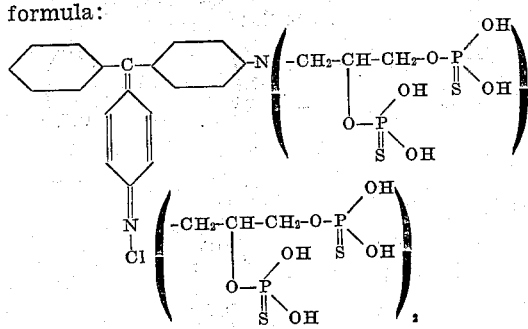

and colors cellulose esters blue-green shades from its aqueous solutions.

In the application of our water-soluble dyes for anti-halation backings on photographic films, the particular dye or mixture of dyes, selected from the group of our dyes having no substituent in the aryl nuclei which is ortho to the arylmethane carbon atom, is ordinarily applied as a composition comprising the dye and a binding agent selected from the group of substances such as gelatin, gum arabic, dextrin, polyvinyl alcohol, and similar kind of substances. A satisfactory composition, among others, is an aqueous gelatin solution of a dye or a combination of dyes selected from the group of Example 3. Approximately 75 grams of gelatin and up to about 10 grams of dye may be employed per 1000 ccs. of water. Alcohol or other water-miscible organic solvents may be added in appropriate amount to the solution, as desired, in order to facilitate the adherence and drying of the composition, when applied to a film base. We have found that the above described type of anti-halation backing is particularly desirable, since it may be satisfactorily applied to a film base, and subsequently easily decolorized and removed from the film in the photographic developing process. As film base, there may be employed sheets comprising cellulose esters such as cellulose nitrate, cellulose acetate, or mixed organic esters of cellulose, viscose, cellulose ethers, and the like.

For the coloration of silk, wool, viscose, cotton or an organic derivative of cellulose such as cellulose acetate, the dye or the mixture of dyes will ordinarily be applied to the material to be colored from an aqueous solution of the dye without the necessity of employing a solubilizing agent. Dyeing can be carried out as follows:

2.5 parts by weight of the dye prepared according to any of the examples are dissolved in 230 parts of water and the mixture heated to about 80-85° C. and maintained at this temperature throughout the dyeing operation. 100 parts of cellulose acetate in the form of a fiber, yarn or fabric are immersed in the dye solution and worked until the desired condition of color has been acquired. Salt may be added during the dyeing operation to promote exhaustion of the dye bath. The material is then removed, washed with soap, rinsed and dried. The cellulose acetate is dyed a shade of color, according to the dye selected, ranging between the limits of from blue to green. The same process is applicable for the coloration of silk, wool, viscose or cotton, by simply substituting such materials in place of the cellulose acetate, in the above example.

An organic derivative of cellulose is intended to include the hydrolyzed as well as the unhydrolyzed organic acid esters of cellulose such as cellulose formate, cellulose acetate, cellulose propionate, cellulose butyrate, and the hydrolyzed as well as the unhydrolyzed mixed organic acid esters of cellulose such as cellulose acetate-propionate and cellulose acetate-butyrate, and cellulose ethers such as methyl cellulose, ethyl cellulose and benzyl cellulose, and the like.

We claim:

The triarylmethane compound having the formula:

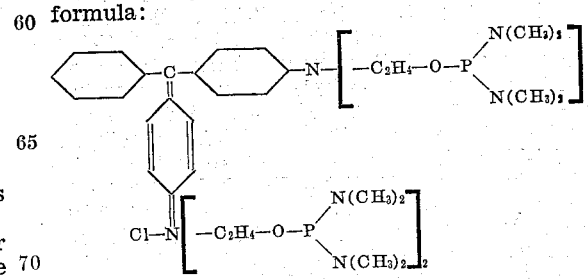

JAMES G. McNALLY.
JOSEPH B. DICKEY.
JAMES A. VAN ALLAN.

Certificate of Correction

Patent No. 2,304,946. December 15, 1942.

JAMES G. McNALLY ET AL.

It is hereby certified that errors appear in the printed specification of the above numbered patent requiring correction as follows: Page 4, first column, line 7, Example 8, for "diphenylmethane" read *triphenylmethane*; and second column, lines 61 to 64 inclusive, for that portion of the formula reading

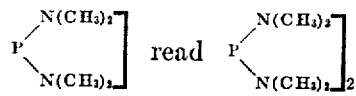

and that the said Letters Patent should be read with these corrections therein that the same may conform to the record of the case in the Patent Office.

Signed and sealed this 16th day of March, A. D 1943.

[SEAL]

HENRY VAN ARSDALE,
*Acting Commissioner of Patents.*